United States Patent [19]

Bevins

[11] 3,914,687

[45] Oct. 21, 1975

[54] CONTINUITY TESTING DEVICE FOR A HIGH VOLTAGE MEASUREMENT DEVICE

[75] Inventor: Marvin W. Bevins, Tulsa, Okla.

[73] Assignee: M. W. Bevins Co., Inc., Tulsa, Okla.

[22] Filed: Apr. 29, 1974

[21] Appl. No.: 464,827

[52] U.S. Cl.................................. 324/51; 324/72.5
[51] Int. Cl.².......................................... G01R 31/02
[58] Field of Search............. 324/51, 72.5, 133, 149

[56] References Cited
UNITED STATES PATENTS

| | | | |
|---|---|---|---|
| 3,392,334 | 7/1968 | Bevins............................ | 324/72.5 X |
| 3,529,237 | 9/1970 | Kilchhofer............................ | 324/51 |
| 3,596,269 | 7/1971 | Laska................................ | 324/51 X |
| 3,831,089 | 8/1974 | Pearce............................. | 324/51 X |

FOREIGN PATENTS OR APPLICATIONS

| | | | |
|---|---|---|---|
| 595,144 | 11/1947 | United Kingdom................... | 324/51 |
| 1,236,403 | 6/1960 | France................................ | 324/51 |

Primary Examiner—Gerard R. Strecker
Attorney, Agent, or Firm—William S. Dorman

[57] ABSTRACT

A continuity testing device for a high voltage measurement device of the type having a pair of elongated staffs having high resistances therein; a diode bridge and a D-C voltmeter wherein the outer ends of the staffs are adapted to be connected separately to high voltage transmission lines, wherein the inner ends of the staffs are connected across a pair of opposite terminals of the diode bridge, and wherein the voltmeter is connected across another pair of opposite terminals of the diode bridge between the terminals to which the staffs are connected; said continuity testing device comprising a jack connected across the same two terminals of the diode bridge to which the ends of the staffs are connected, a low voltage D-C source, a double-pole double-throw switch connected to one terminal of said D-C source, a current limiting resistor connected to said double-pole double-throw switch at the opposite side thereof from said D-C source, a transistor series-connected through its collector and emitter between said current limiting resistor and other terminal of said D-C source, a bias resistor connected at one end to the base of said transistor, a lead connected at one end to the other end of said bias resistor, the other end of said lead having means for connecting the same to the other end of each staff separately, and a plug means connected to said double-pole double-throw switch and adapted to be received in said jack.

6 Claims, 3 Drawing Figures

U.S. Patent   Oct. 21, 1975   3,914,687
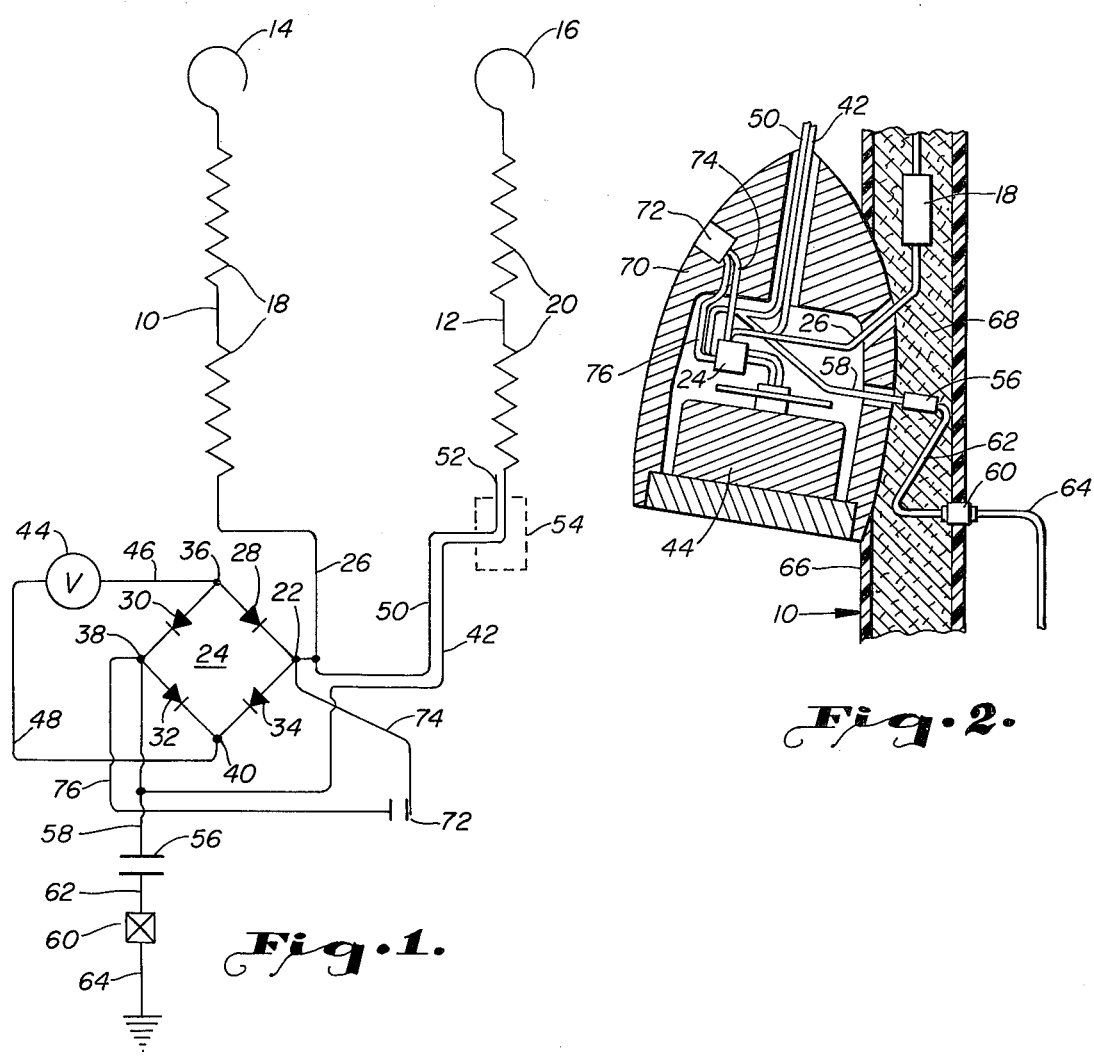
Fig. 1.
Fig. 2.
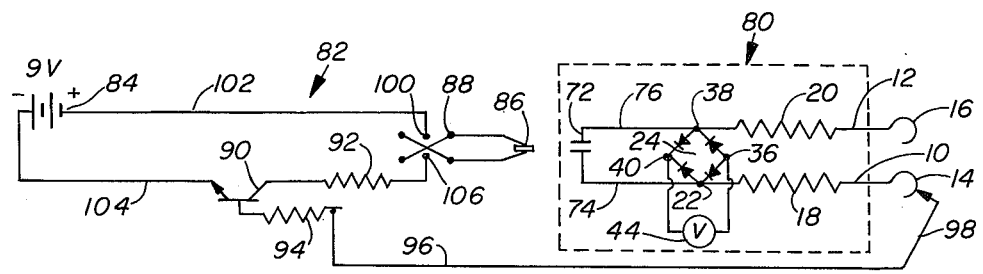
Fig. 3.

CONTINUITY TESTING DEVICE FOR A HIGH VOLTAGE MEASUREMENT DEVICE

BACKGROUND OF THE INVENTION

1. Field of the Invention

The present invention relates to devices for measuring the voltage across high voltage transmission lines and, more particularly, to a continuity testing device for use in conjunction with said high voltage testing device to demonstrate the proper operating conditions of the high voltage testing device.

2. Description of the Prior Art

Voltage measurement devices of the type to which the present invention is applied are well known in the art. Such high voltage measurement devices are described in my prior U.S. Pats. NO. 3,193,765, issued July 6, 1965, and No. 3,392,334, issued July 9, 1968.

At the present time there is no practical way of determining, in the field, whether a given high voltage measurement device is fully operative, except, perhaps, by comparing the same with another such device which is known to be operative. Of course, the high voltage measurement device can be tested in the shop.

It is important, when men are working on high voltage transmission lines, that these high voltage testing devices are in proper functioning order; otherwise, a man could be killed or severely injured by coming into contact with a high voltage transmission line which had been tested as "dead" by an inoperative testing device.

SUMMARY OF THE INVENTION

It is a basic purpose of the present invention to provide a simple continuity testing device which can be used in the field to determine the proper operating condition of high voltage testing devices to prevent needless accidents, as indicated above. The high voltage testing device itself will generally include a pair of elongated staffs having high resistance therein, a diode bridge, and a D-C voltmeter; the outer end of the staffs are adapted to be connected separately to high voltage transmission lines, the inner ends of the staffs are connected across a pair of opposite terminals of the diode bridge and the voltmeter is connected across another pair of opposite terminals of the diode bridge between the terminals to which the staffs are connected; a reading on the voltmeter will indicate the presence of voltage, and the strength across the high voltage transmission lines being tested. The continuity testing device of the present invention involves one simple modification of the high voltage measurement device itself. That is, a jack is placed in the case housing the voltmeter and the terminals of the jack are connected to the same two terminals of the diode bridge to which the ends of the staff are connected. A separate circuit constituting the continuity testing device itself includes a low voltage D-C source, such as a 9 volt D-C battery, a double-pole double-throw switch connected to one terminal of the D-C source, a current limiting resistor connected to the double-pole double-throw switch at the opposite side thereof from the D-C source, a bias resistor connected at one end to the base of the transistor, a lead connected at one end to the other end of the bias resistor, the other end of the lead having means for connecting the same to the other end of each staff seaparately, and a plug means connected to the double-pole double-throw switch and adapted to be plugged into the jack which has been previously installed in the voltmeter casing.

In testing a high voltage measuring device of the type described above, the plug of the continuity testing device is inserted into the jack in the voltmeter casing. The end of the lead is connected to the outer end of one staff and the double-pole double-throw switch is thrown to its two opposite positions. A reading on the voltmeter for both positions will show that the resistors of that staff and at least two of the diodes of the bridge are operative. The lead is then connected to the outer end of the other staff, and the double-pole double-throw switch is thrown to its two opposite positions. Readings on the voltmeter for both of the positions of the double-pole double-throw switch will show that the resistors in the other staff and other two diodes are also operative.

BRIEF DESCRIPTION OF THE DRAWINGS

FIG. 1 is a circuit diagram of a high voltage measurement device for which the presnet continuity testing device is designed;

FIG. 2 is a cross-sectional view, partially diagrammatic, through a portion of a staff and voltmeter housing of a high voltage measurement device and showing the addition of a phone jack which is used in conjunction with the circuit of the present invention; and, FIG. 3 is a circuit diagram showing the continuity testing device of the present invention employed with a simplified form of the high voltage measurement device shown in FIG. 1.

DESCRIPTION OF THE PREFERRED EMBODIMENT

Referring to the drawings in detail, FIG. 1 shows diagrammatically a high voltage measuring device of the type shown and described in greater detail in my prior U.S. Pat. No. 3,392,334, issued July 9, 1968. Briefly stated, the high voltage measuring device includes a pair of elongated and rigid staffs 10 and 12, which include outer hook portions 14 and 16, respectively, adapted to be disposed over high voltage lines (not shown). The staff 10 includes a plurality of resistors 18 arranged in series, and staff 12 includes a plurality of resistors 20 arranged in series. The end of the staff 10 opposite from the hook portion 14 connects with a terminal 22 on a diode bridge 24 through a lead 26. The diode bridge 24 consists of four diodes 28, 30, 32, and 34. The terminal 22, referred to above, is between diodes 28 and 34. Another terminal 36 is provided between the diodes 28 and 30, a third terminal 38 is provided between the diodes 30 and 32, and a fourth terminal 40 is provided between the diodes 32 and 34.

The end of the staff 12 opposite from the hook 16 connects with the terminal 38 of the diode bridge 24 by means of the lead 42. It should be noted that the terminal 38 is opposite from the terminal 22. A voltmeter 44 is connected across opposite terminals 36 and 40 of the diode bridge 24 between the terminals 22 and 38. The diodes 28, 30, 32, and 34 are connected in the manner shown in the drawing such that the current will flow to the voltmeter 44 in the same direction regardless of the manner in which the two hooks 14 and 16 are placed over the electrical transmission lines (not shown). The voltmeter is preferably connected to the terminals 36 and 40 by means of leads 46 and 48, respectively.

The circuit of FIG. 1 also shows a means for determining phase relationships as set forth in my aforementioned patent, U.S. Pat. No. 3,392,334. This phase determining means, briefly, includes a conductor or lead 50 which connects with the terminal 22 and runs parallel with lead 42 terminating at a point 52 spaced below the lower resistor 20 of the staff 12. The leads 42 and 50 may be conveniently wound on a spool 54 whereby the length of the portion of the cable 42 extending between the staffs 10 and 12 may be controlled in accordance with the length necessary during utilization of the voltage measurement device. The phase testing means also includes a capacitor 56 which connects with the terminal 38 by means of the lead 58. The other end of the capacitor connects with a jack 60 by means of a lead 62. The jack 60 is also adapted to receive a grounded plug member 64 which can be inserted in the jack 60 as desired. When it is desired to use the phase measurement device of my aforementioned patent, U.S. Pat. No. 3,392,334, the grounded plug member 64 is plugged into the plug 60; otherwise, the grounded plug member 64 is not employed.

FIG. 2 shows how some of the components of FIG. 1 are mounted on and in the staff 10. The probe or staff 10 preferably includes a substantially cylindrical housing 66 constructed from a suitable non-conducting material, such as epoxiglass, or the like, and is preferably filled with plastic foam material 68, such epoxy resin, or the like. The voltmeter 44, which is a suitable D-C voltmeter of any well known type, is secured in a nonconducting case 70 constructed of plastic, wood, or the like. The case 70 also preferably includes the diode bridge 24, and the ends of the various leads as shown. The capacitor 56 is preferably imbedded in the epoxy resin 68, and the jack 60 is preferably located in the wall of the housing 66. The casing 70 is preferably removably secured to the outer periphery of the housing 66 in any well known manner (not shown) and is also preferably positioned thereon in such a manner that the meter 44 will be visible when viewed from the lowermost end of the rod or staff 10.

The circuit of the aforementioned patent, U.S. Pat. No. 3,392,334, is modified by the present invention only to the extent that a jack 72, such as a two conductor phone jack, is inserted in the meter housing 70, and connects with the terminals 22 and 38 by means of leads 74 and 76, respectively.

As diagrammatically shown in FIG. 3, the circuit of FIG. 1 is shown in simplified form (and without the phasing means) by the reference character 80. The testing circuit of the present invention is shown by the reference character 82. The circuit 82 includes a 9 volt D-C battery 84, a phone plug 86 which is adapted to fit into the phone jack 72, a double-pole double-throw switch 88, a transistor 90, a current limiting resistor 92, a bias resistor 94, and a lead 96, the outer end of which 98 can be adapted to connect with the hook portion 14 or the hook portion 16. The positive terminal of the battery is connected to one terminal 100 of the switch 88 by means of the lead 102. The other terminal of the battery connects with the emitter of the transistor 90 by means of the lead 104. The collector of the transistor 90 connects through the current limiting resistor 92 to another terminal 106 on the switch 88. The bias resistor 94 connects between the base of the transistor 90 and the lead 96.

With the end 98 of the lead 96 in contact with the hook 14, and assuming that one position of the switch 88 provides positive voltage to the lower part of the jack 72, the positive voltage goes directly through the resistor 18 to the bias resistor 94 to fire the transistor 90 and cause conduction through the resistor 92 to the meter 44, creating a reading on the meter. Flipping the switch 88 would provide positive voltage on the upper part of the jack so that positive voltage would pass through the diodes of the bridge 24, then through the resistor 18 to the bias resistor 94 also causing the transistor 90 to fire, also creating a reading on the meter 44.

When the end 98 of the lead 96 is placed on the hook 16, and assuming positive voltage has been applied through the switch 88 to the upper part of the jack 72, positive voltage would pass directly through the resistor 22 to the bias resistor 94 causing the transistor to fire, and causing a deflection of the needle (not shown) on the meter 44. Flipping the switch 88 in the opposite position would place positive voltage on the lower part of the jack 72 causing positive voltage to pass through the diodes of the diode bridge 24 then through the resistor 20 and to the bias resistor 94, also causing the transistor 90 to fire, and also creating a reading on the meter 44.

As can be seen from the above, it is not only possible to check the continuity of the resistors 18 and 20, but also the conductivity of the diodes in the diode bridge 24.

The voltage measurement device shown in FIG. 1 is generally designed to measure high voltages in the order of several thousand volts, generally from 2KV up to 13.2KV and beyond. The resistors 18 and 20 in each staff 10 or 12, respectively, can vary in value from 6 meg ohms to 50 meg ohms. The transistor 90 shown in FIG. 3 is preferably, but not necessarily, a D40C1, which is sometimes referred to as a Darlington amplifier, generally considered to be two transistors connected together in cascade. For the purposes of illustration, the transistor 90 is shown as a single transistor, as well it might be. The uniqueness of the circuit 82 is that it can be used to test a circuit which is normally used in connection with many thousands of volts with a mere 9 volt D-C battery. The visual indication of continuity appears on the same meter 44 which is normally used to read thousands of volts. The current limiting resistor 92, for example, can be in the order of 7,500 ohms, and the bias resistor 94 is preferably in the order of 680K ohms. Considering the application of the circuit 82 in conjunction with the voltage testing device 80 shown in FIG. 3, it might be argued that the bias resistor 94 is unnecessary. On the other hand, if some one should accidentally touch the point 98 of the probe 96 to ground, the resistor 94 will prevent over-conduction of the transistor 90.

Whereas the present invention has been described in particular relation to the drawings attached hereto, it should be understood that other and further modifications, apart from those shown or suggested herein, may be made within the spirit and scope of this invention.

What is claimed is:

1. Apparatus for testing the continuity of a high voltage measuring device of the type having a voltage sensing means in series with a very high resistance which comprises: a low voltage D-C source, a current limiting resistor, and a transistor; means connecting said D-C source, said current limiting resistor, said voltage sensing means and the emitter-collector portions of said transistor in circuit; and means connecting the high resistance of said high voltage measuring device between said D-C source and the base of said transistor to provide a bias circuit therefor; whereby said transistor will conduct and actuate said voltage sensing means when said high resistance provides electrical continuity.

2. Apparatus as set forth in claim 1 wherein said voltage sensing means is a voltmeter.

3. In a high voltage measuring device of the type having a pair of staffs having high resistances therein and a voltage sensing means, wherein outer ends of the staffs are adapted to be connected separately to high voltage transmission lines, and wherein the inner ends of the staffs are connected across a said voltage sensing means; a continuity testing device for said high voltage measurement device comprising a jack connected across said voltage sensing means, a low voltage D-C source, a switch connected to one terminal of said D-C source, a current limiting resistor connected to said switch at the opposite side thereof from said D-C source, a transistor series connected through its collector and emitter between said current limiting resistor and the other terminal of said D-C source, a bias resistor connected at one end to the base of said transistor, a lead connected at one end to the other end of said bias resistor, the other end of said lead having means for connecting the same to the outer end of each staff separately, and a plug means connected to said switch adapted to be received in said jack.

4. Apparatus as set forth in claim 3 wherein said voltage sensing means is a voltmeter.

5. In a high voltage measuring device of the type having a pair of staffs having high resistances therein, a diode bridge and a D-C voltmeter wherein the outer ends of the staffs are adapted to be connected separately to high voltage transmission lines, wherein the inner ends of the staffs are connected across a pair of opposite terminals of the diode bridge, and wherein the voltmeter is connected across another pair of opposite terminals of the diode bridge between the terminals to which said staffs are connected; a continuity testing device for said high voltage measurement device comprising a jack connected across the same two terminals of the diode bridge to which the ends of the staffs are connected, a low voltage D-C source, a double-pole double-throw switch connected to one terminal of said D-C source, a current limiting resistor connected to said switch at the opposite side thereof from said D-C source, a transistor series connected through its collector and emitter between said current limiting resistor and the other terminal of said D-C source, a bias resistor connected at one end to the base of said transistor, a lead connected at one end to the other end of said bias resistor, the other end of said lead having means for connecting the same to the outer end of each staff separately, and a plug means connected to said double-pole double-throw switch adapted to be received in said jack.

6. A method of testing the continuity of a high voltage measuring device of the type having a voltage sensing means in series with a very high resistance which comprises: connecting the voltage sensing means alone in circuit with a low voltage D-C source, a current limiting resistor and the emitter-collector portions of a transistor; and connecting the high resistance of said high voltage measuring device between the low voltage D-C source and the base of said transistor to provide a bias circuit therefor; whereby said transistor will conduct and actuate said voltage sensing means when said high resistance provides electrical continuity.

* * * * *